G. A. MOHR.
REPLANTING ATTACHMENT FOR CULTIVATORS.
APPLICATION FILED FEB. 9, 1916.

1,192,926.

Patented Aug. 1, 1916.
2 SHEETS—SHEET 1.

Witnesses

Inventor
Gustav A. Mohr.
By Victor J. Evans
Attorney

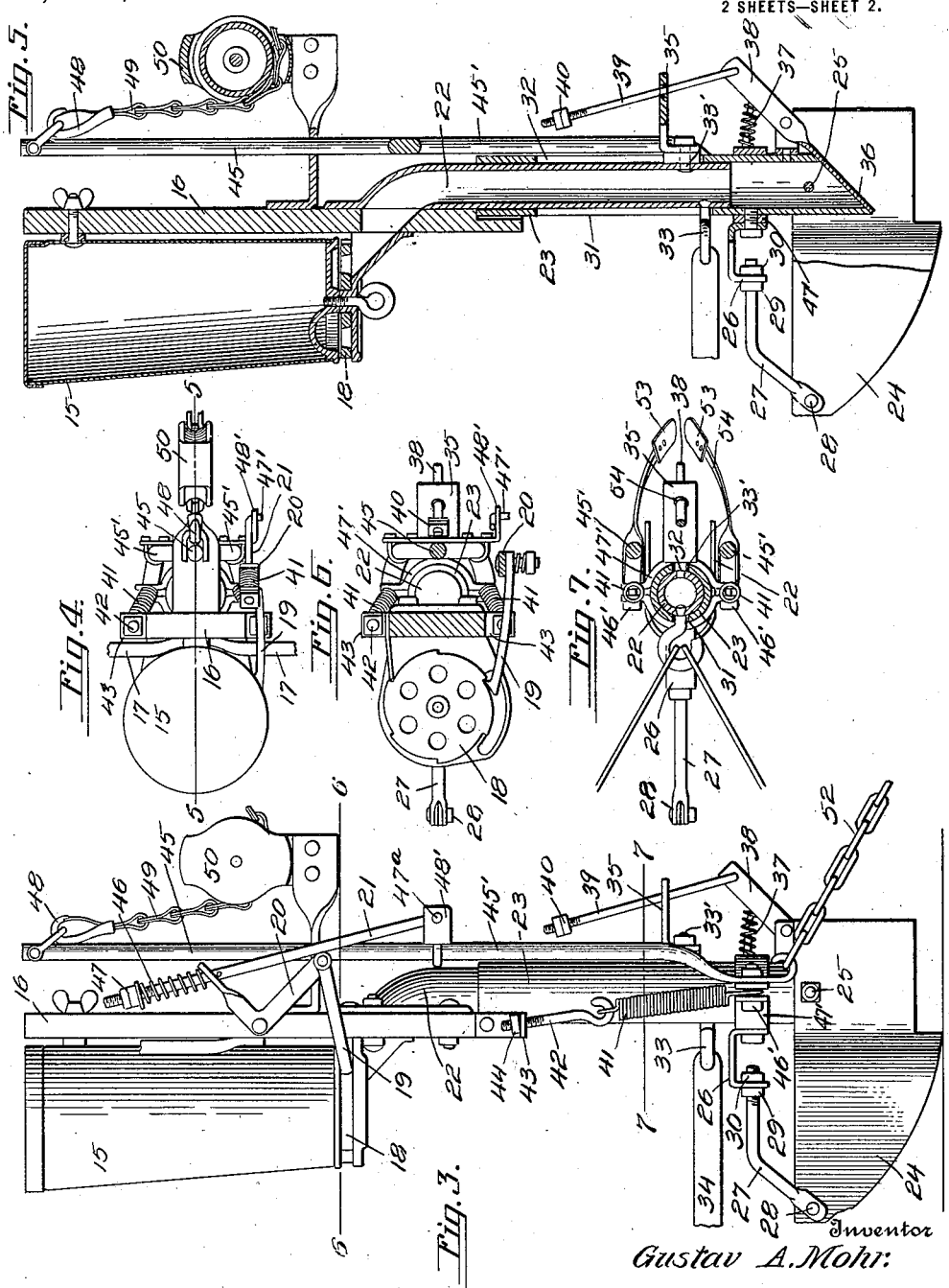

UNITED STATES PATENT OFFICE.

GUSTAV A. MOHR, OF REMSEN, IOWA.

REPLANTING ATTACHMENT FOR CULTIVATORS.

1,192,926.      Specification of Letters Patent.      Patented Aug. 1, 1916.

Application filed February 9, 1916. Serial No. 77,232.

*To all whom it may concern:*

Be it known that I, GUSTAV A. MOHR, a citizen of the United States, residing at Remsen, in the county of Plymouth and State of Iowa, have invented new and useful Improvements in Replanting Attachments for Cultivators, of which the following is a specification.

This invention relates to replanting attachments for cultivators, and it has for its object to provide a simple and improved device of this class which may be readily applied to and used in connection with a riding cultivator of ordinary conventional construction.

A further object of the invention is to produce a replanting attachment of simple and improved construction which may be readily actuated by the driver or operator of the cultivator in connection with which it is used for the purpose of replanting hills where the seed previously planted has failed to sprout.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
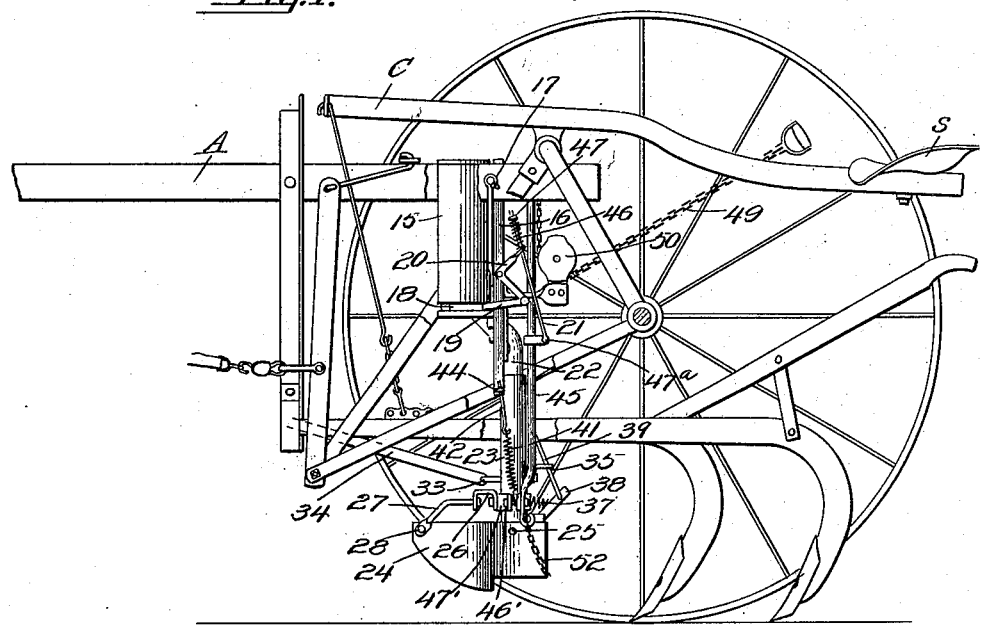
Figure 2:
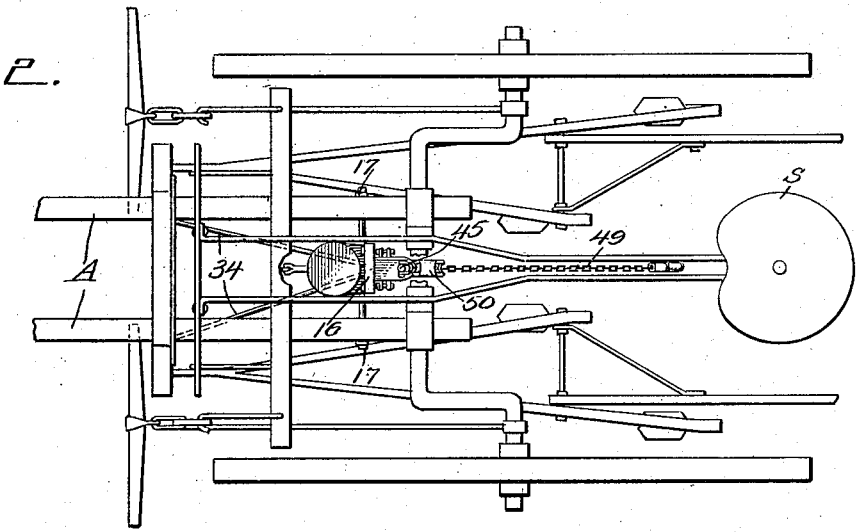

In the drawings, Figure 1 is a side elevation showing the improved replanting device applied to a cultivator, parts of the cultivator having been broken away. Fig. 2 is a top plan view of the same. Fig. 3 is a side elevation, enlarged, of the replanting device detached from the cultivator. Fig. 4 is a top plan view of the same. Fig. 5 is a vertical sectional view taken on the line 5—5 in Fig. 4. Fig. 6 is a horizontal sectional view taken on the line 6—6 in Fig. 3. Fig. 7 is a horizontal sectional view taken directly above the shoe and showing a different covering attachment.

Corresponding parts in the several figures are denoted by like characters of reference.

The improved replanting attachment includes a cylindrical hopper or receptacle 15 mounted on a vertical support 16 which is equipped with hooks 17 whereby it may be mounted upon and suspended from the arch A of a cultivator C or some other suitable support. The hopper is provided with seed dropping mechanism of well known construction including a revolving seed disk or plate 18 which is circumferentially toothed and adapted to be rotated by a dog 19 carried by one arm of a bell crank lever 20, the other arm of which is apertured for the passage of a substantially vertical operating rod 21, the precise arrangement of which, as well as the manner of actuating the same will be presently described. Extending downwardly from the hopper is a seed duct 22 on which telescopes an outer tube 23 carrying at its lower end the shoe or furrow opener 24, the latter being connected with the outer tube by means of pivot members 25, about which the shoe may swing to various positions. For the purpose of securing the shoe in adjusted positions the tube 23 is provided with a bracket 26 having an aperture for the passage of a bolt 27 which is pivotally connected at 28 with the forward end of the shoe, said bolt being suitably bent intermediate its ends and provided with adjusting nuts 29, 30 abutting against the front and rear faces of the bracket 26, thereby maintaining the shoe in adjusted position.

The front and rear sides of the outer tube 23 are provided with slots 31, 32. The slot 31 is for the passage of an eye bolt 33 which is fastened to the inner tube or seed duct 22 and the eye of which is connected by one or more braces 34 with the cultivator frame. The slot 32 is for the passage of a fastening member, such as a bolt 33' which is connected with the inner tube or seed duct and which serves for the attachment to said seed duct of a rearwardly extending bracket 35 which projects through the slot 32 in the rear side of the tube 23. The lower end of the tube 23 is provided with a spring actuated foot valve 36 which is normally kept in a closed or obstructing position by an actuating spring 37, said valve being provided with a handle or lever 38 with which is pivotally connected an actuating rod 39, the latter being guided through the bracket 35 and provided with a stop member or engaging member such as a nut 40 which is threaded thereon or otherwise adjustably connected therewith, said stop member serving when the outer tube 23 is moved in a downward direction to engage the bracket 35, thus causing the foot valve to be opened against the tension of its actuating spring.

The outer tube 23, together with the shoe and related parts, is normally supported in a relatively raised position by means of springs 41, the upper ends of which are connected with hook bolts 42, which latter extend through apertured lugs or ears 43 carried by the supporting member 16 and having nuts 44 which may be adjusted on the hook bolts for the purpose of regulating the tension of the springs 41. For the purpose of depressing the tube 23 carrying the shoe 24 and the related parts against the tension of the springs 41, an operating rod 45 is provided, said rod being bifurcated to form limbs 45', best seen in Fig. 7, the lower ends of said limbs being connected by bolts 46' with a collar 47' surrounding the outer tube 23 at a point directly above the shoe. The rod or link 21 by means of which the bell crank 20 carrying the dog 19 engaging the seed disk is actuated is pivotally connected with one of the limbs 45' of the operating rod 45 through the medium of a pivot member 47ª extending through a bracket 48' which is mounted on said limb; a spring 46 is coiled about the link or rod 21 between the arm of the bell crank 20 through which said rod is guided and a stop member, the latter consisting of a nut 47 threaded on the upper end of the rod.

Connected with the upper end of the operating rod 45 by means of a snap hook 48 or in any other convenient manner is one end of a chain 49, said chain being guided by suitable guide means including a pulley block 50 to within a convenient distance of the operator whose seat is shown at S, said chain being provided with a handle 51 whereby it may be readily tensioned when desired for the purpose of forcing the operating rod 45 and related parts in a downward direction.

For the purpose of covering the seed deposited by the replanter, a short chain 52 may be terminally connected with the lower ends of the limbs 45' of the operating rod or with some suitable point of attachment adjacent to the sides of the shoe, the chain being of such length that the bight thereof will engage the ground directly in rear of the shoe, the weight of the chain being such that by dragging the chain over the ground the dirt displaced by the shoe will be returned to the furrow and the surface of the ground leveled. By the construction shown in Fig. 7 a modified covering device is used, the same comprising covering blades 53 carried by arms 54 which are connected with the outer tube 23 directly above the shoe.

When the improved replanting device is mounted upon a cultivator frame the shoe 24 will be supported at a proper distance above the ground to avoid interference with the row of plants that is being cultivated, the shoe being obviously supported in alinement with the row of plants. To operate the replanter the chain 49 is tensioned, thereby forcing the rod 45 in a downward direction, carrying the outer tube 23 and the shoe 24 downwardly against the tension of the lifting springs 37. By the downward movement of the operating rod the bell crank 20 will be tilted by the action of the rod 21, and the foot valve 36 will likewise be tilted by the action of the rod 39, the stop members on the respective rods 21 and 39 having been previously adjusted so that the seed disk and the foot valve will be, respectively, actuated at the proper time. The spring 46 on the rod 21 will also permit said rod to move downwardly subsequently to the actuation of the seed disk, which latter operation should obviously take place previous to the actuation of the foot valve in order that the seed discharged by the operation of the seed disk through the duct or tube 22 may be intercepted by the foot valve and not discharged over the latter until the shoe has formed an opening in the ground for the reception of the seed. It is evident that proper adjustment of the respective working parts will enable the various operations to be performed in proper sequence. As soon as the seed has been deposited, the tension on the chain 49 is relaxed, and the lifting springs 37 will then restore the parts to their initial position.

It is obvious that within the scope of the invention the manner of supporting the replanting device on the cultivator may be varied according to the type or make of the cultivator in connection with which the device is employed.

Having thus described the invention, what is claimed as new, is:—

1. In a replanting device, a support, a hopper mounted thereon and having a downwardly extending seed duct, an outer tube telescoping on the duct and having front and rear slots, an eye bolt extending from the duct through the front slot of the outer tube, a bracket secured on the duct and extending through the rear slot of the outer tube, a spring actuated foot valve obstructing the lower end of the outer tube and having a lever, a rod pivotally connected with the valve lever and guided through the bracket, said rod having a stop member adjustably mounted thereon, means including springs for supporting the outer tube in a relatively raised position with respect to the seed duct, and means for depressing the outer tube against the tension of the springs.

2. In a replanting device, a support, a hopper mounted thereon and having a downwardly extending seed duct, an outer tube telescoping on the duct and having front and rear slots, an eye bolt extending from the duct through the front slot of the outer tube, a bracket secured on the duct and extending through the rear slot of the outer tube, a spring actuated foot valve obstructing the lower end of the outer tube and having a lever, a rod pivotally connected with the valve lever and guided through the bracket, said rod having a stop member adjustably mounted thereon, means including springs for supporting the outer tube in a relatively raised position with respect to the seed duct, and means for depressing the outer tube against the tension of the springs; in combination with a shoe constituting a furrow opener, pivot members connecting the shoe with the outer tube near the lower end of the latter, and means for adjustably connecting the front end of the shoe with the outer tube to support the shoe at various pivotal adjustments.

In testimony whereof I affix my signature in presence of two witnesses.

GUSTAV A. MOHR.

Witnesses:
M. A. MIERAS,
FRANK SHREEKER.

Copies of this patent may be obtained for five cents each, by addressing the "Commissioner of Patents, Washington, D. C."